US009607162B2

(12) United States Patent
Roth et al.

(10) Patent No.: US 9,607,162 B2
(45) Date of Patent: *Mar. 28, 2017

(54) IMPLEMENTATION OF SECURE COMMUNICATIONS IN A SUPPORT SYSTEM

(71) Applicant: Amazon Technologies, Inc., Seattle, WA (US)

(72) Inventors: Gregory B. Roth, Seattle, WA (US); Eric D. Crahen, Seattle, WA (US); Graeme D. Baer, Seattle, WA (US); Eric J. Brandwine, Haymarket, VA (US); Nathan R. Fitch, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/714,982

(22) Filed: May 18, 2015

(65) Prior Publication Data

US 2015/0347763 A1    Dec. 3, 2015

Related U.S. Application Data

(63) Continuation of application No. 13/248,980, filed on Sep. 29, 2011, now Pat. No. 9,037,511.

(51) Int. Cl.
*G06F 21/00* (2013.01)
*G06F 21/60* (2013.01)
(Continued)

(52) U.S. Cl.
CPC ........ *G06F 21/602* (2013.01); *G06F 9/44505* (2013.01); *G06F 9/45558* (2013.01);
(Continued)

(58) Field of Classification Search
CPC .................................................. G06Q 20/382
(Continued)

(56) References Cited

U.S. PATENT DOCUMENTS 6,606,663 B1    8/2003    Liao et al.
6,895,501 B1    5/2005    Salowey et al.
(Continued)

FOREIGN PATENT DOCUMENTS

CN        1448017       10/2003
CN        101410803      4/2009
(Continued)

OTHER PUBLICATIONS

U.S. Appl. No. 13/248,980, "Final Office Action Received", Mar. 28, 2013, 27 Pages.
(Continued)

*Primary Examiner* — James A Reagan
(74) *Attorney, Agent, or Firm* — Kilpatrick Townsend & Stockton LLP

(57) ABSTRACT

A support system negotiates secure connections on behalf of multiple guest systems using a set of credentials associated with the guest systems. The operation of the secure connection may be transparent to the guest system such that guest system may send and receive messages that are encrypted or decrypted by the support system, such as a hypervisor. As the support system is in between the guest system and a destination, the support system may act as a local endpoint to the secure connection. Messages may be altered by the support system to indicate to a guest system which communications were secured. The credentials may be managed by the support system such that the guest system does not require access to the credentials.

20 Claims, 8 Drawing Sheets

(51) Int. Cl.
*G06F 9/445* (2006.01)
*G06F 9/455* (2006.01)
*H04L 29/06* (2006.01)
*G06Q 30/06* (2012.01)

(52) U.S. Cl.
CPC ........ *G06F 21/606* (2013.01); *H04L 63/0209* (2013.01); *H04L 63/0428* (2013.01); *H04L 63/08* (2013.01); *H04L 63/166* (2013.01); *G06F 2009/45587* (2013.01); *G06Q 30/06* (2013.01); *H04L 63/0471* (2013.01)

(58) Field of Classification Search
USPC .......................................................... 705/50
See application file for complete search history.

(56) References Cited

U.S. PATENT DOCUMENTS

| | | | |
|---|---|---|---|
| 7,587,366 | B2 | 9/2009 | Grim, III et al. |
| 8,010,679 | B2 * | 8/2011 | Low .................... G06F 3/1415 709/217 |
| 8,340,283 | B2 | 12/2012 | Nadalin et al. |
| 9,037,511 | B2 * | 5/2015 | Roth .................... G06F 21/602 705/1.1 |
| 2002/0069369 | A1 | 6/2002 | Tremain et al. |
| 2004/0174875 | A1 | 9/2004 | Geagan, III et al. |
| 2006/0206904 | A1 | 9/2006 | Watkins et al. |
| 2007/0171921 | A1 | 7/2007 | Wookey et al. |
| 2007/0180448 | A1 | 8/2007 | Low et al. |
| 2009/0119504 | A1 | 5/2009 | van Os et al. |
| 2009/0282266 | A1 * | 11/2009 | Fries .................... G06F 21/602 713/193 |
| 2009/0288167 | A1 | 11/2009 | Freericks et al. |
| 2010/0125856 | A1 | 5/2010 | Dash et al. |
| 2010/0162235 | A1 | 6/2010 | Ginzton et al. |
| 2011/0016322 | A1 | 1/2011 | Dean et al. |
| 2011/0141124 | A1 * | 6/2011 | Halls .................... G06F 21/83 345/522 |
| 2011/0302042 | A1 | 12/2011 | Hatakeyama |
| 2011/0302650 | A1 | 12/2011 | Brown |
| 2012/0196566 | A1 | 8/2012 | Lee et al. |
| 2012/0310679 | A1 | 12/2012 | Olson et al. |
| 2013/0006840 | A1 | 1/2013 | Cahn |
| 2013/0007459 | A1 | 1/2013 | Godfrey et al. |
| 2013/0085880 | A1 | 4/2013 | Roth et al. |

FOREIGN PATENT DOCUMENTS

| | | | |
|---|---|---|---|
| CN | 102195940 | 9/2011 | |
| EP | 1914959 | 4/2008 | |
| EP | 1914959 A1 * | 4/2008 | ............ H04L 67/06 |
| JP | 2007266938 | 10/2007 | |
| JP | 2008078878 | 4/2008 | |
| JP | 2008520018 | 6/2008 | |
| JP | 2008299617 | 12/2008 | |
| JP | 2009223776 | 10/2009 | |
| JP | 2010500694 | 1/2010 | |
| JP | 2010062738 | 3/2010 | |
| RU | 2412468 | 2/2011 | |
| WO | 2009155574 | 12/2009 | |
| WO | 2011081935 | 7/2011 | |
| WO | 2013049571 | 4/2013 | |

OTHER PUBLICATIONS

U.S. Appl. No. 13/248,980, "Non Final Office Action", Sep. 10, 2014, 9 pages.
U.S. Appl. No. 13/248,980, "Non-Final Office Action", mailed May 31, 2012, 13 pages.
U.S. Appl. No. 13/248,980, "Non-Final Office Action", mailed Nov. 2, 2012, 14 pages.
U.S. Appl. No. 13/248,980, "Notice of Allowance", mailed Feb. 2, 2015, 18 pages.
U.S. Appl. No. 13/312,760, "Stateless and Secure Authentication", U.S. Patent Application, filed Dec. 6, 2011.
U.S. Appl. No. 13/312,774, "Browser Security Module", U.S. Patent Application, filed Dec. 6, 2011.
U.S. Appl. No. 13/322,199, "Authentication Through a Secret Holding Proxy", U.S. Patent Application, filed Dec. 20, 2011.
AU2012515751, "Examination Report", mailed Mar. 23, 2015, 3 pages.
CA2,849,911, "Office Action", mailed Jun. 30, 2015, 4 pages.
EP12834621.0, "Extended European Search Report", mailed Jun. 29, 2015, 6 pages.
JP2014-533394, "Notice of Allowance", mailed Jul. 28, 2015, 6 pages.
JP2014-533394, "Office Action", mailed Feb. 24, 2015, 5 pages.
PCT/US2012/057918, "International Search Report and Written Opinion Received", Dec. 6, 2012, 16.
SG2014011571, "Office Action", mailed Sep. 10, 2014, 4 pages.
CA2,849,911, "Office Action", Dec. 3, 2015, 3 pages.
CN201280047648.3, "Office Action", Dec. 25, 2015, 26 pages.
RU2014117204, "Office Action", Jun. 25, 2015, 9 pages.
RU2014117204, "Decision to Grant", Dec. 16, 2015, 28 pages.
AU2015215904, "First Examination Report", Sep. 9, 2016, 3 pages.
CN201280047648.3, "Office Action", Sep. 2, 2016, 13 pages.

* cited by examiner

IMPLEMENTATION OF SECURE COMMUNICATIONS IN A SUPPORT SYSTEM

CROSS-REFERENCE TO RELATED APPLICATIONS

This application is a Continuation of U.S. patent application Ser. No. 13/248,980, filed Sep. 29, 2011, entitled "IMPLEMENTATION OF SECURE COMMUNICATIONS IN A SUPPORT SYSTEM", and issued on May 19, 2015 as U.S. Pat. No. 9,037,511, which is incorporated herein by reference in its entirety.

BACKGROUND

Properly configuring secure communications can be difficult in many situations. For example, secure communication protocols, such as the secure sockets layer (SSL) and transport layer security (TLS) protocols, can be configured in an operating system. Configuring protocols within the operating system may require configuring a certificate from a certification authority and/or key pairs that form the basis for secure communications. Not only can such configuration of the operating system be difficult, but each protocol implementation, operating system and/or application may have differing configuration requirements for accessing secure communications, such as the cryptographic functionality. Not only may differing configuration requirements be difficult to implement, but if the operating system or application has not been properly hardened, the certificate and/or private key may be at risk of loss through server compromise by an intruder. Loss of a private key causes a loss of trust in the cryptographic benefits of secure communication, as the key may be used by the intruder.

Attempts to offload cryptography from the operating system configuration have resulted in several application programming interfaces. For example, a public key cryptography standard PKCS#11 has been used in a virtual machine to expose cryptographic primitives without exposing the key itself to the guest operating system. However, the solution can be difficult to configure, as different software may have different requirements for using PKCS#11. While various techniques have been employed to effectively simplify the use of secure communications, due to the complexity of the tasks, the employed techniques are of varied success.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for implementing secure communication in a support system on behalf of a guest operating system. For example, a support system in a virtualized environment, such as a hypervisor, may negotiate, encrypt and decrypt communications on behalf of a guest operating system among one or more guest operating systems on a host. On top of normal duties in managing the one or more guest operating systems, the hypervisor may also process messages between a destination computing system and the guest operating system. The hypervisor may use credentials identifying the guest operating system to create and maintain secure communication channels with the destination computing system. While secure communication channels are open, the hypervisor may store the associated keys, secrets, and other state information for each secure communication session. By examining the routing of each incoming or outgoing communication, the hypervisor may match which state may be used to process the communication, such as encrypting or decrypting the communication. The processing of messages by the hypervisor may allow the secure communications to be transparent to the guest operating system. For example, the guest operating system may send decrypted messages through a virtual driver that are captured by the hypervisor and encrypted before exiting the host. By providing secure communications, the hypervisor may protect the secrets of a guest operating system from a compromise of the guest operating system, as well as reduce the burden of configuring the guest operating system. The secure communications also may provide the benefit of message integrity, authenticity and/or secrecy.

Figure 1:
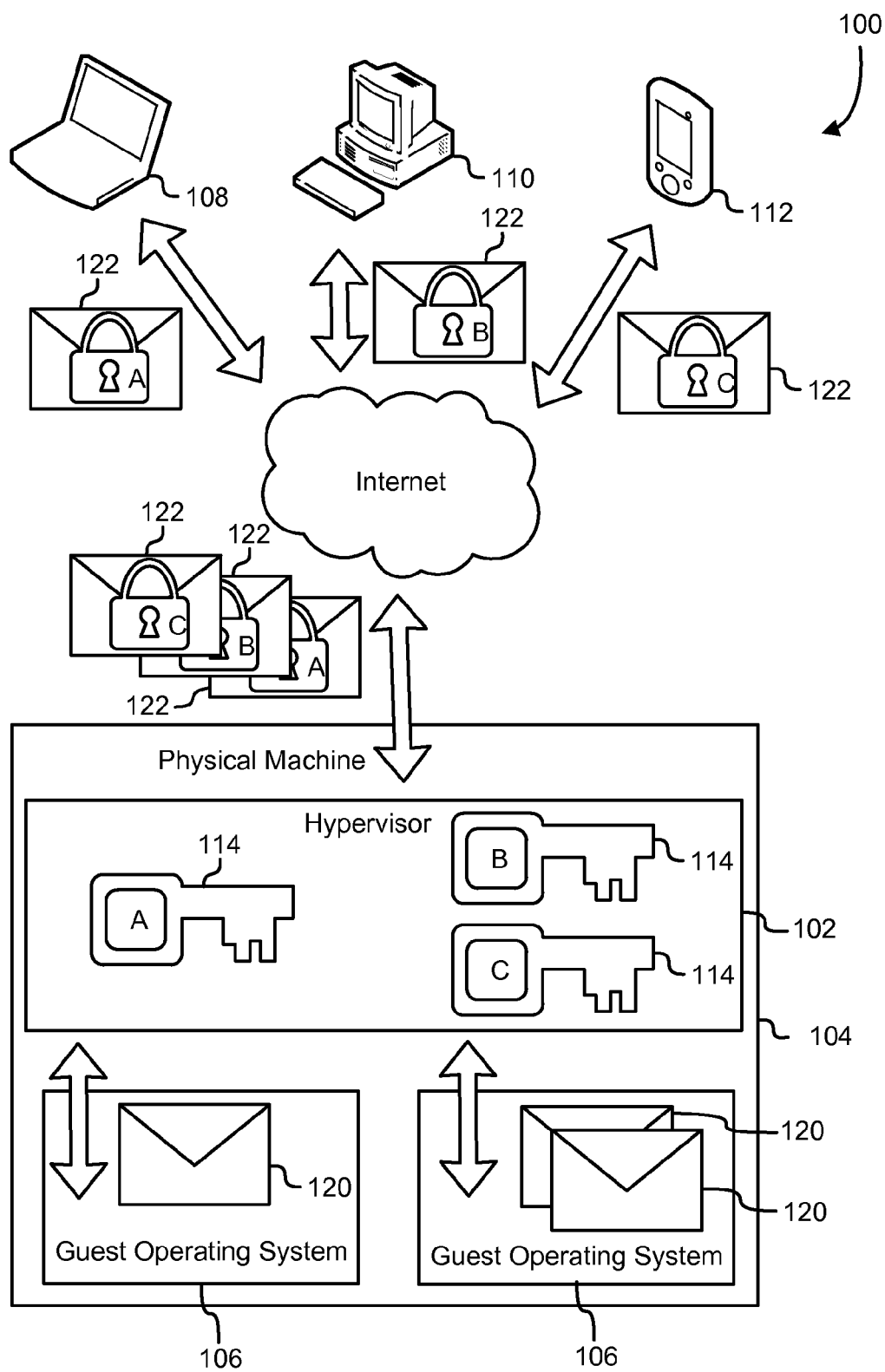
FIG. 1 shows an illustrative example of secure communication message flow to a guest operating system in accordance with at least one embodiment.
Figure 2:
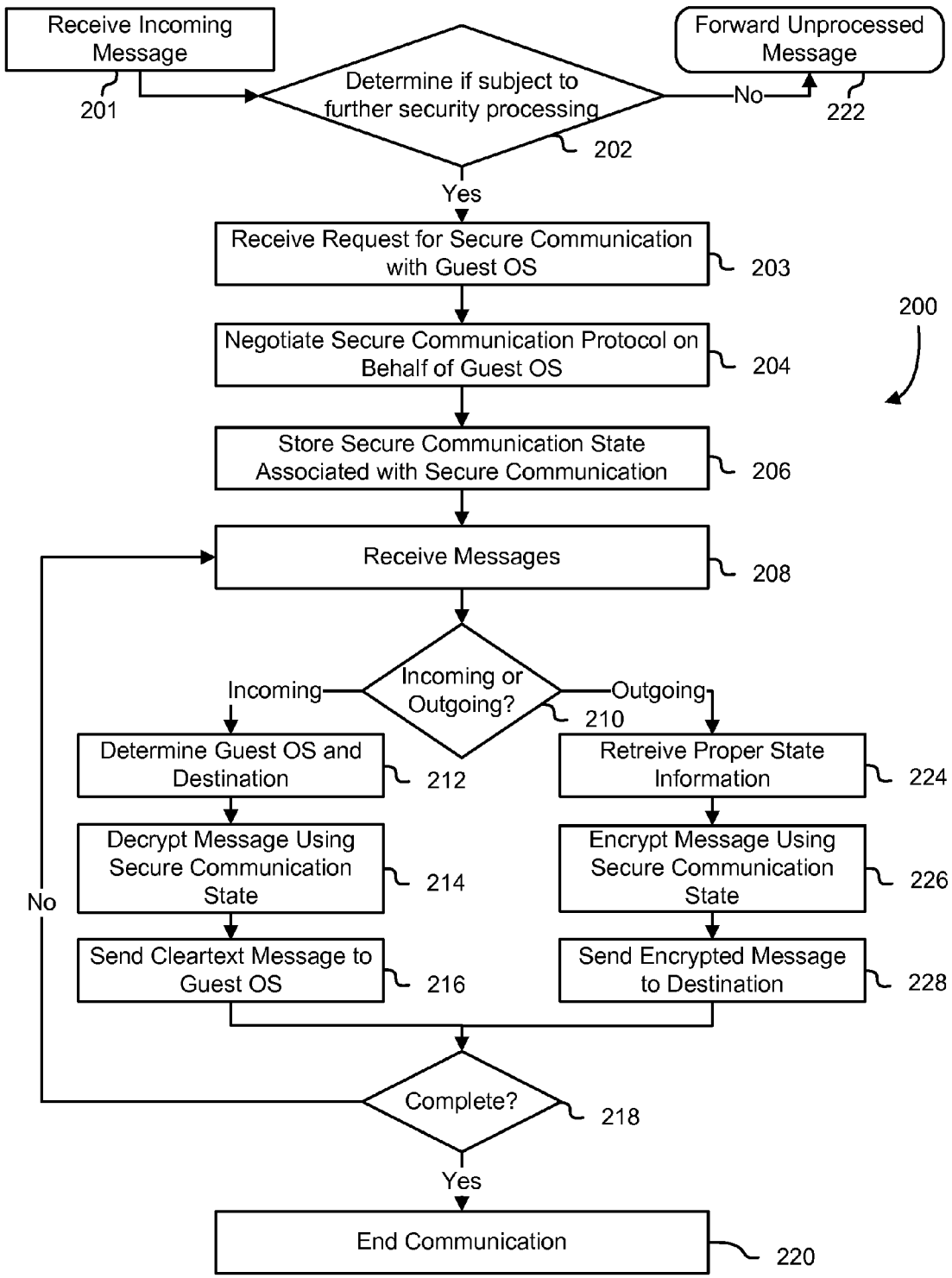
FIG. 2 shows an illustrative example of a process that may be used to enable secure communications in a virtualized environment in accordance with at least one embodiment.
Figure 3:
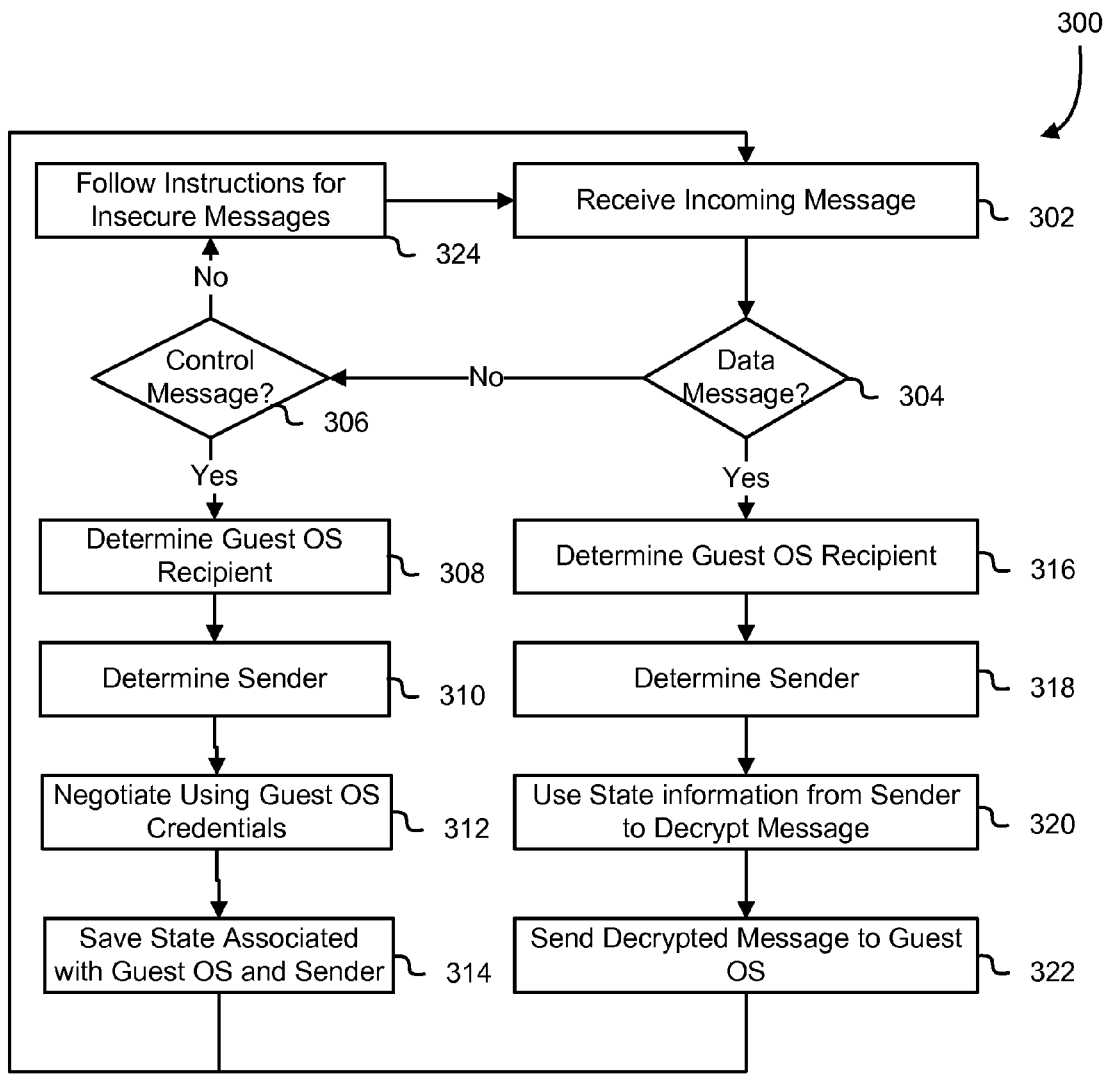
FIG. 3 shows an illustrative example of a process that may be used to receive secure communications in a virtualized environment in accordance with at least one embodiment.
Figure 4:
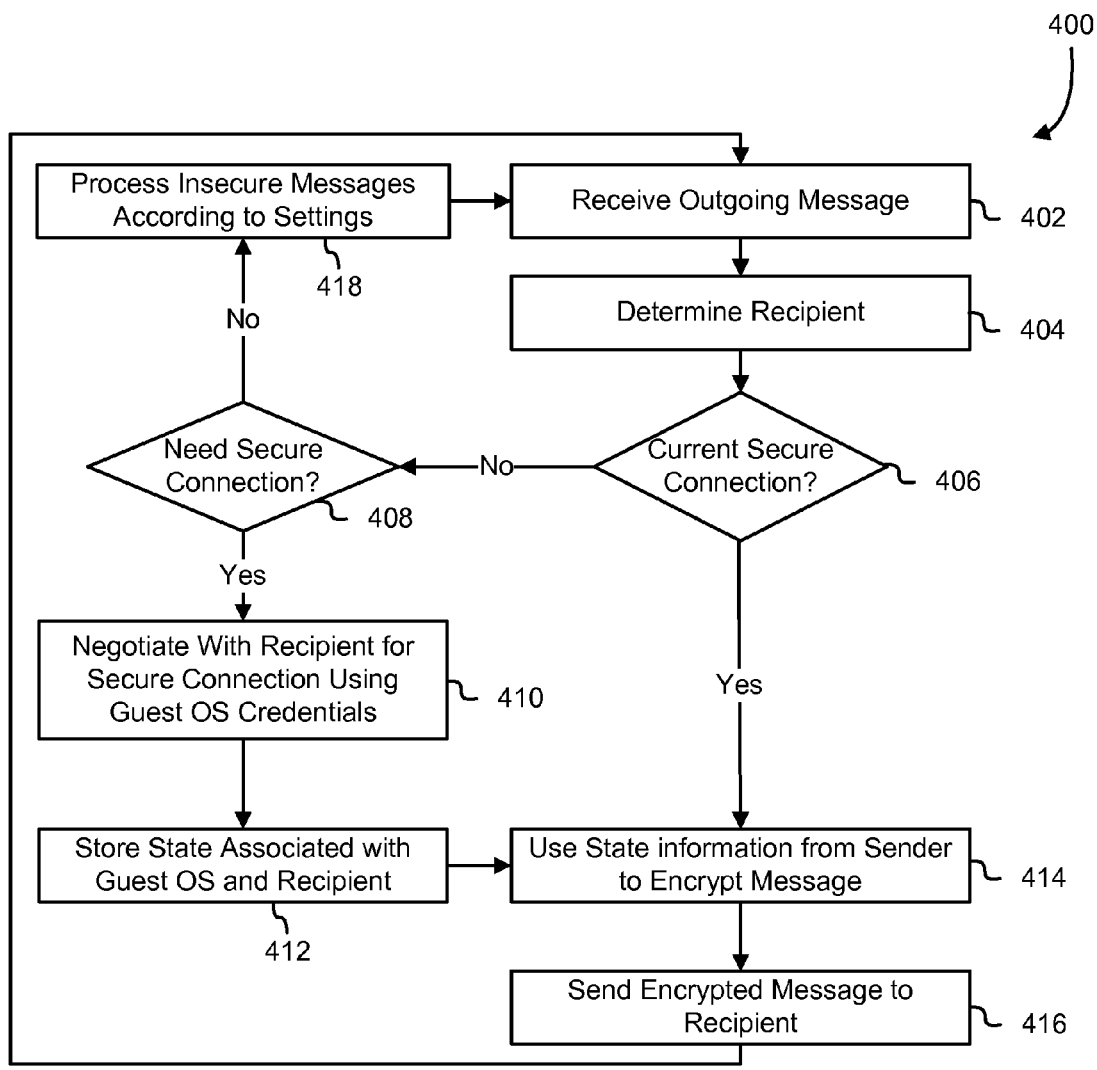
FIG. 4 shows an illustrative example of a process that may be used to send secure communications in a virtualized environment in accordance with at least one embodiment.

FIG. 1 illustrates an example of an environment 100 in which the implementation of secure communications in a support system may be performed in accordance with at least one embodiment. A hypervisor 102 on a physical machine 104 may service guest operating systems 106. Guest operating systems 106 may send and receive messages from other computing devices, including laptops 108, desktops 110 and mobile devices 112, including mobile phones. For example, FIGS. 2-4 show illustrative examples of processes that may be used to send and/or receive secure messages. The hypervisor 102 may negotiate secure connections with the computing devices 108, 110, 112 and save state information 114 associated with each secure connection. Cleartext messages 120 (or messages that were encrypted by a higher-level application running within the guest operating system 106) may be sent by the guest operating system 106 and captured by the hypervisor 102.

The hypervisor 102 may use state information 114 associated with the guest operating system 106 and destination computing device to prepare secure messages 122 from the cleartext messages 120. The secure messages 122 may then be sent to their destination computing devices 108, 110, 112.

Incoming secure messages may also be processed by the hypervisor. Incoming secure messages 122 may be examined by the hypervisor to determine the destination guest operating system and the source computing device 108, 110, 112. Using the determined destination and source, the hypervisor 102 may then use the associated state information 114 to prepare a cleartext message 120 and/or verify the integrity of the secure message 122. The cleartext message 120 may then be sent to the guest operating system 106.

While the hypervisor 102 has been discussed as an example of the support system for the guest operating system, other configurations may also be possible, including other hardware and/or software implementations. A hypervisor may be viewed as a virtualization support system, including Dom0 in a Xen® system, a parent partition in a Hyper-V system and services provided by the virtualization system to a guest operating system. In one embodiment a security component, such as a cryptographic processor or a hardware security module (HSM), may be used. Depending on whether multiple guest operating systems 106 are supported by the HSM, the hypervisor may facilitate communication with the HSM and the guest operating system. For example, a hypervisor 102 may route secure messages with a guest operating system destination to an HSM. Cleartext messages received from the HSM may then be received by the hypervisor 102 and routed to the guest operating system 106. In another embodiment, the support system may be a virtualized driver. The virtualized driver may provide the benefits of a secure connection, such as message integrity, authenticity and secrecy, through use of Hash-based Message Authentication Codes (HMAC) and encryption. For example, use of a virtualized driver by a guest operating system may indicate use of a secure connection. The driver may sign with an HMAC and encrypt outgoing messages. The HMAC may prove message integrity and authority because only the holder of a private key could sign the message, the signature also verifying the integrity of the message through a hash function. Having been encrypted, the message may also be reasonably presumed secret. In another embodiment, a support system or support systems may provide secure communication for guest systems, e.g., a computer system that has an operating system running directly on the hardware of the computer system. For example, a support system may be a computing resource that receives messages on behalf of guest systems that may be other computing resources. The computing system may receive cleartext messages from a guest system and process the messages to be sent by a secure protocol. Received messages may be processed and sent in cleartext to the destination guest system. One advantage may be that the guest systems may be protected from accessing credentials. For example, the guest system may not be able to directly access credentials unless a user selects a setting to allow it. In some embodiments, only a service provider may access the credentials; the guest system may not.

As cleartext messages do not leave a trust boundary, messages may still be considered to be secure in at least some situations. A trust boundary may be defined by a system in which all sub-systems are trusted. As cleartext messages are prepared in the physical machine boundary or over a trusted connection to an HSM, the cleartext messages may not leave a boundary of trusted computing devices, including network devices. If the guest operating system is viewed as less secure than the support system, such as may be the case with applications or systems in constant development, the secrets may actually be viewed as more secure in the support system. For example, an application may have a vulnerability that is exploitable by an intruder that allows the intruder into the guest operating system. However, as the private information is stored with the hypervisor, the private information, such as private keys, are not accessible to the intruder because the private information is not accessible to the guest operating system. In some embodiments, a user may only have access to the guest operating system, as the hypervisor and other computing resources may be managed by an entity. If the entity is more experienced in hardening systems than the user, the user may desire the entity to manage the private information and secure connections.

Several advantages may be realized by moving the responsibility for secure communications from a guest operating system to the support system, such as a hypervisor. For example, secure communications may no longer be operating system dependent. As the secure communication implementation is in the hypervisor, guest operating systems of various versions and brands may take advantage of secure communications. Versions of secure communication protocols may be updated in the hypervisor with less potential effect on the guest operating system. Guest operating systems may be updated with less potential added complexity of secure communication configuration or conflicts. With the implementation in a support system, automation may become more practical. As configuring of the hypervisor may be similar across hosts, if not the same despite differences in guest operating systems, the automation need only target the hypervisor. Automated configuration of secure communications such as SSL and/or TLS may be desirable because an administrator of a server would not have to learn how to manually configure a server. Application programming interface (API) automation of enabling SSL/TLS and/or recycling certificates and other secrets may also be enabled due to automation. With automation, secure communications may become more transparent to a developer with minimal configuration, as messages sent in cleartext are secured by the support system and not the guest operating system. For example, a developer would only need to direct an application to communicate using a channel of communication, such as a driver, adapter, IP address or port visible on the guest operating system to request secure communications. The support system, such as a hypervisor, may receive messages over the channel and implement secure communications with a destination device specified by the application on the guest operating system. Other advantages to moving the secure communications functionality to a support layer include, but are not limited to, the ability to upgrade the protocols there without any application specific reconfiguration or changes (crypto agility), and the ability to leverage any hardware cryptographic acceleration in a standard manner without operating system or application specific support.

In one embodiment, a hypervisor on a host machine, as may be seen in FIG. 1, may secure a communication on behalf of a guest operating system through a secure communication process 200. Some or all of the process 200 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

A hypervisor may receive an incoming message 201. If the message requires 202 further security processing, the hypervisor may receive 203 the request as a request for a secure communication with a guest operating system and an external computing system. Otherwise, the hypervisor may forward 222 the message unprocessed. The hypervisor may negotiate 204 the secure protocol on behalf of the guest operating system using guest operating system credentials, such as IP address, keys and/or certificate information. Information related to the protocol and its state, such as exchanged keys, secrets and other state data, may be stored 206 and associated with the guest operating system. Messages may then be received 208 from the external computing system and/or the guest operating system by the hypervisor. If messages are incoming 210, the hypervisor may determine 212 the guest operating system destination and external computing system source. Using the destination and source, the hypervisor may look up the state information and guest operating system credentials in order to decrypt 214 and verify the incoming message. Verification may verify the integrity and authenticity of the message. The cleartext message may then be sent 216 to the guest operating system. If the communication is complete 218, the hypervisor may end the communication 220 by terminating a communication link to the external computing system and removing the associated state information. If not 218, the system may await more messages 208.

If cleartext outgoing messages are received from a guest operating system 210, the hypervisor may use the guest operating system source with the associated destination of the message to retrieve 224 state information. Using the state information, the hypervisor may encrypt 226 and/or sign with a HMAC the cleartext outgoing message. The encrypted outgoing message may then be sent to the destination 228. If the communication is complete 218, the hypervisor may terminate the session 220. Otherwise the hypervisor may await the next message 208.

Several advantages may be obtained in the process 200 shown in FIG. 2. New incoming secure communication messages may be transparent to a guest operating system. With new incoming communication, the hypervisor may negotiate with the originator of the request without contacting the destination guest operating system. Once the hypervisor has finished the negotiation, secure messages may then be delivered between the originator and the guest operating system. Multiple guest operating systems may be also serviced by a single hypervisor having access to credentials for each guest operating system. Each guest operating system may have its own credentials, such as certificate, IP address, keys and other individual information. These credentials may resolve to a physical host controlled by a hypervisor. As the hypervisor acts as a gateway between the guest operating systems and the outside world, the hypervisor may be able to negotiate on behalf of each of the guest operating systems without configuration or knowledge by external systems participating in the negotiations. For example, an incoming communication may come in through a hardware interface. A hypervisor may receive the communication from the hardware interface and determine the communication is a secure communication. Using the credentials of the guest operating system, the hypervisor may step into the role of the guest operating system to create and maintain a secure connection. As the hypervisor may always be part of a route to the guest operating system, a computing device using the secure connection may not be capable to discern that the hypervisor is negotiating and securing messages on behalf of the guest operating system.

Configuration of a hypervisor may include selecting options for outgoing and incoming secure connections. In one embodiment, an administrator may choose among multiple options for determining which communications should be secured, such as: securing all connections, defining secure and insecure ports, auto detecting whether messages should be treated as secure, defining secure and insecure IP addresses, and defining secure and insecure adapters. For example, network traffic on ports 22 and 80 may be treated as insecure, but traffic over port 443 may be secured. In another embodiment, the guest operating system may have two IP addresses. One of the IP addresses can be used to receive insecure messages, while a second address may indicate to the hypervisor to form and maintain a secure connection. A hypervisor may determine if a communication should be secured by explicit or implicit information. In one embodiment, incoming network traffic may be implicitly defined, such as by inspection. For example, if incoming traffic appears to be secured through a protocol, such as SSL/TLS, then the hypervisor may use the secure protocol determined. In another embodiment, incoming network traffic may be explicitly defined, such as the traffic over specified ports or IP addresses.

Turning to FIG. 3, it illustrates a process that can be executed by a computer system such as physical machine 104 of FIG. 1. In one embodiment, a hypervisor on a host machine may process secure messages received through a receiving process 300. The hypervisor may receive 302 an incoming message. If the message is not a secure message 304 and the message is 306 a secure communication control message, a secure communication control process may be followed. Examples of control messages may include handshaking or renegotiation. The hypervisor control process may determine 308 the destination guest operating system to use the guest operating system credentials in a negotiation. The sender may be determined 310 to associate with state information. Using the determined information, the hypervisor may negotiate 312 any changes to or preparation of a secure connection with the sender on behalf of the guest operating system. New and modified state information may be saved and associated 314 with the guest operating system and the sender. In another example, the hypervisor may intercept requests to reestablish a secure connection. Using saved state information, such as session information, the communication may be resumed.

If the message is 304 a secured message, the hypervisor may start a message receipt process by determining 316 the guest operating system destination and determining 318 the sender information. Using the destination and sender information, the hypervisor may look up the associated state information. Using the state information, the hypervisor may decrypt 320 and/or verify the message. The decrypted message may then be sent 322 to the guest operating system. Should the decryption 322 and/or verification fail, the hypervisor may react to the failure, such as requesting another message, reporting the failure, terminating the connection and/or renegotiating the connection.

If the message is determined 304 not to be a secure message and determined 306 not to be a secure communication control message, the message may be treated 324 as an insecure message. Depending on the user settings, insecure messages may or may not be allowed. In some embodiments all insecure messages may be rejected. In other embodiments, the insecure message may be given to an insecure message handling process. For example, the hypervisor may determine that all messages to defined ports on the guest operating system may be secured, while other defined ports may receive insecure messages. In one embodiment, rules may also be coordinated with a firewall, such that insecure message routes are blocked outside of a trusted network, while secured messages may be allowed through the firewall.

Turning to FIG. 4, it illustrates a process that can be executed by a computer system such as physical machine 104 of FIG. 1. As shown in the figure, a hypervisor on a host machine may use a secure sending process such as sending process 400 when receiving a message from a guest operating system. The hypervisor may receive 402 an outgoing message from a guest operating system. If the message is not 406 part of current secure connection but is in need 408 of a secure connection, a secure connection may be negotiated. For example, a secure connection may need to be established or renegotiated. Using the credentials of the guest operating system, a secure connection may be negotiated 410 on behalf of the guest operating system by the hypervisor. The state of the connection may be stored 412 as associated with the guest operating system and recipient of the secure connection. Having either prepared the secure connection after operation 412 or having a current connection 406, the state information may be used to encrypt the received message 414. The encrypted message may then be sent 416 to the recipient. In some embodiments, insecure messages may be allowed, which have neither a current secure connection 406 or need a secure connection 408. Insecure messages may, thus be processed 418 according to user settings. In one embodiment, all communications must be secure. Any insecure communications may be dropped and/or raise an error.

A hypervisor may determine whether a sending of a message should be secured. The hypervisor may explicitly or implicitly determine the need for secure communications. For example, if a connection is currently open to a destination computing system, then communication with the destination may be implicitly assumed to use secure communications. In another example, each incoming message may be inspected such that messages that appear to be secured or need to be secured may be processed by the hypervisor. In some embodiments, all outgoing communication is assumed to be secured. In another embodiment, the guest operating system may request a new secure communication channel be opened with a destination through an API call. Otherwise, the communication may be over a normal communication channel. In other embodiments, a guest operating system may explicitly select a secure communication by using a channel of communication, such as a driver, virtual adapter, IP Address or port.

A support system, such as a hypervisor, may thus secure connections between multiple computing devices and multiple guest operating systems on a host machine. Both initial incoming and initial outgoing requests for a secure connection may be accommodated. Using credentials assigned to a guest operating system, the support system may act on behalf of guest operating systems in creating and maintaining secure connections. The support system may use channels of communication to determine which communications to secure or pass through for each of the guest operating systems. In one embodiment, the support system may modify a message header, such as a HTTP header, to indicate that a communication was received through a secure connection.

Figure 5:
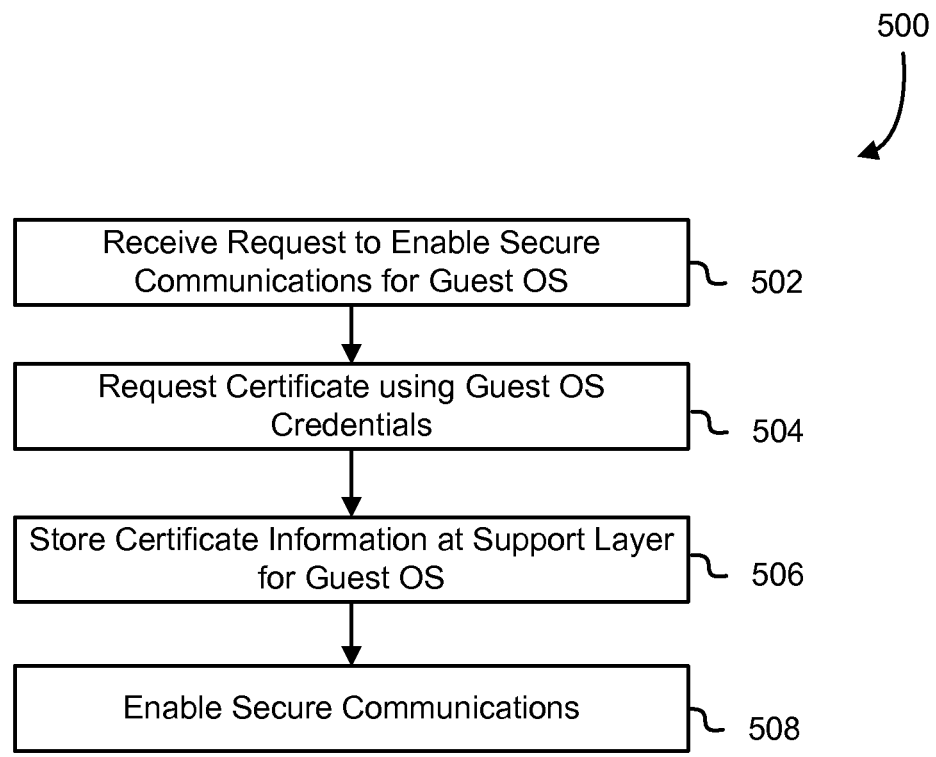
FIG. 5 shows an illustrative example of a process that may be used to prepare a virtual machine for secure communications in accordance with at least one embodiment.

The hypervisor may reside in host system within a data plane, which may be managed by a control plane. Requests for changes may be received by the control plane and performed on computing resources in the data plane. For example as seen in FIG. 5, a user may request a control plane to enable secure communications on a computing resource. The control plane may receive 502 the request from the user. In response, the control plane may create keys and request 504 a certificate be issued for the computing resource. The certificate information may be delivered to the support system of the computing resource, such as the hypervisor, for installation, storage 506 and use when needed. Using the user-provided settings, secure communications may then be enabled 508.

Figure 6:
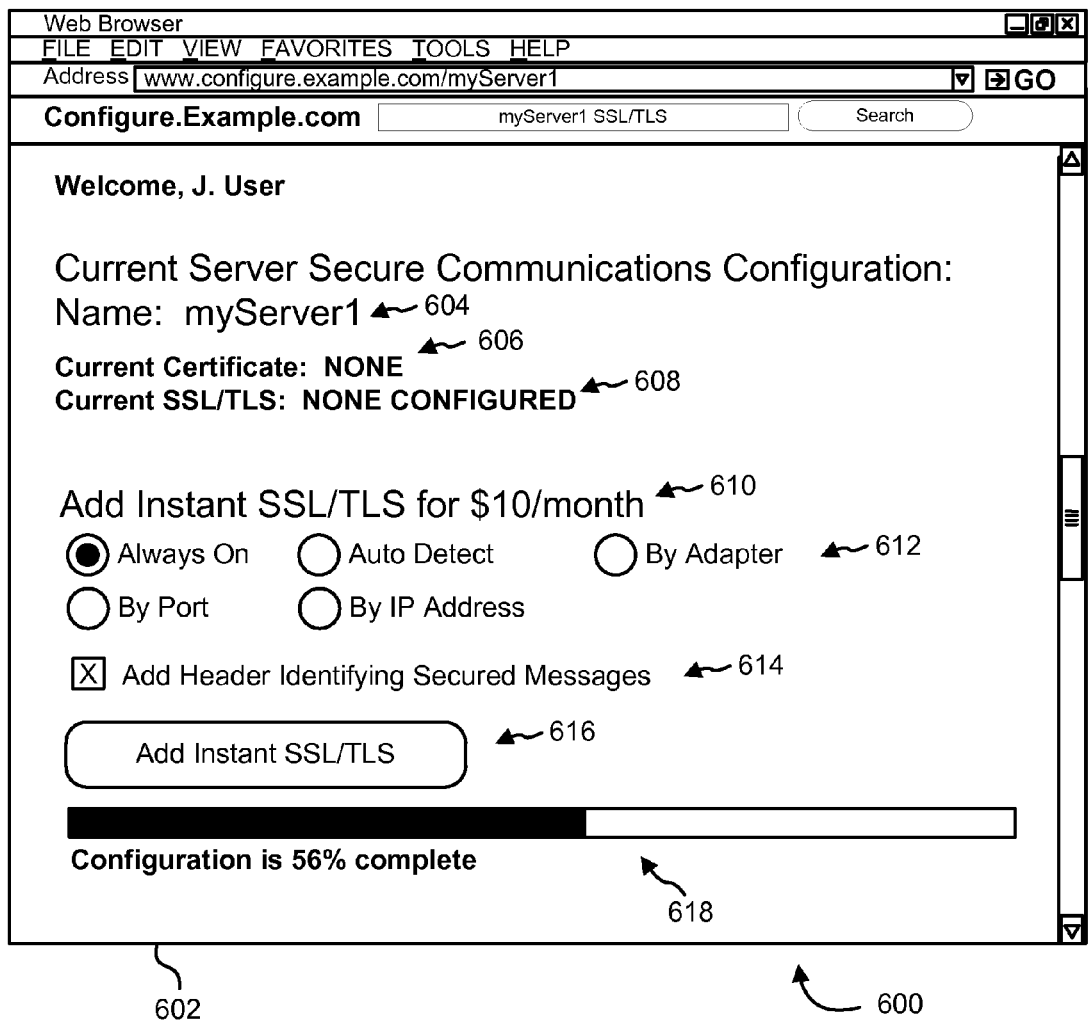
FIG. 6 shows an illustrative example of a web page that may be used to configure secure communications in accordance with at least one embodiment.

User-specified configuration may be received through multiple channels, including API calls, applications and web sites. An example of a web site 600 for configuring secure communication in a support system is shown in FIG. 6. The web site 600 may be accessed by a web browser 602. The web site may contain current configuration information such as the name of the server 604, current certificate information 606 and current secure protocol configuration information 608. An offer 610 to add secure communication in exchange for value may be offered as a service to the user. The user may select among multiple options 612 to configure the secure communication service. In the embodiment shown, the user may select among multiple options to configure which communications should be secured. These options include to always use secure communication, only use specific ports for secure communication, auto-detect secure communication, use specific IP addresses for secure communications, or by virtual Ethernet adapter. If desired, the user may also request an indication that a communication was secured by modifying a message, such as a HTTP header. The user may then click a button 616 to enable secure communication on the selected guest operating system. In the embodiment shown, the secure communication is in the process of being set up. A progress indicator 618 may indicate the progress of an automatic set up process enabling the hypervisor to secure communications on behalf of the selected guest operating system.

After the user clicks the button 616 to enable secure communication, a control plane may begin the process of setting up secure communications for the selected guest operating system. For example, the control plane may receive the request to set up secure communications for the guest operating system. The control plane may create a public/private key pair on behalf of the guest operating system. Using identifying information about the guest operating system and the public key, the control plane request a digital certificate be issued to the guest operating system. The control plane may then deliver the secure communication setup information, such as digital certificate, keys and other secure information to the hypervisor through a trusted network. The hypervisor may store the secure setup information for use in preparing secure communications on behalf of the guest operating system. Once complete, the hypervisor may notify the control plane that the setup is complete. The control plane may then notify the user that the setup is complete and the secure communication may be enabled. In some embodiments, this process may run without further user intervention from the click of the button 616. In other embodiments, the user may be allowed to intervene, such as import digital certificate and/or key pair information rather than having it generated for the user.

A service provider 712 may enable secure communications through enabling a support system to intercept and secure communications to and from a guest system 706, 728. An example of a guest system can include a physical computer system including an operating system that runs directly on the hardware of the physical computer system and an example of service provider credential generation and use 700 may be seen in FIG. 7. A customer through a computing resource 702 may request to enable secure communications on a guest system 706 maintained by the customer. A server 704 within a control plane may receive the request for enabling secure communications and create a request to generate credentials 710 for the guest system 706. A control plane may manage computing resources in a data plane, such guest system 706. A credential generator 708 may generate and set up credentials 710. This credential generation may include contacting a certificate authority to obtain a valid digital certificate. Upon receiving the credentials 710, the server 704 may send the credentials to a support system responsible for the secure communications of the guest system 706. In one embodiment, the support system may be a network device, such as a network attached security component 718. In the embodiment shown in FIG. 7, the network attached security component 718 is contained within a switch 716, although the network attached security component 718 may stand alone in other embodiments. The network attached security component 718 may receive the credentials 710 and configuration to secure communications arriving to and originating from the guest system 706. For example, incoming secured messages 720 may be received by the gateway 721 to a service provider 712 and routed through an internal network 714 to the switch 716 providing the secure communications service to the guest system 706. The network attached security component 718 may decrypt and/or verify incoming secured messages 720 resulting in cleartext messages 722. The cleartext messages 722 may then be sent to the destination guest system 706. Outgoing messages from the guest system 706 may be intercepted by the network attached security component 718. The outgoing messages may be secured, including encrypted, and sent through the internal network 714, out the gateway 721 and through the Internet 724 to reach the destination system.

Figure 7:
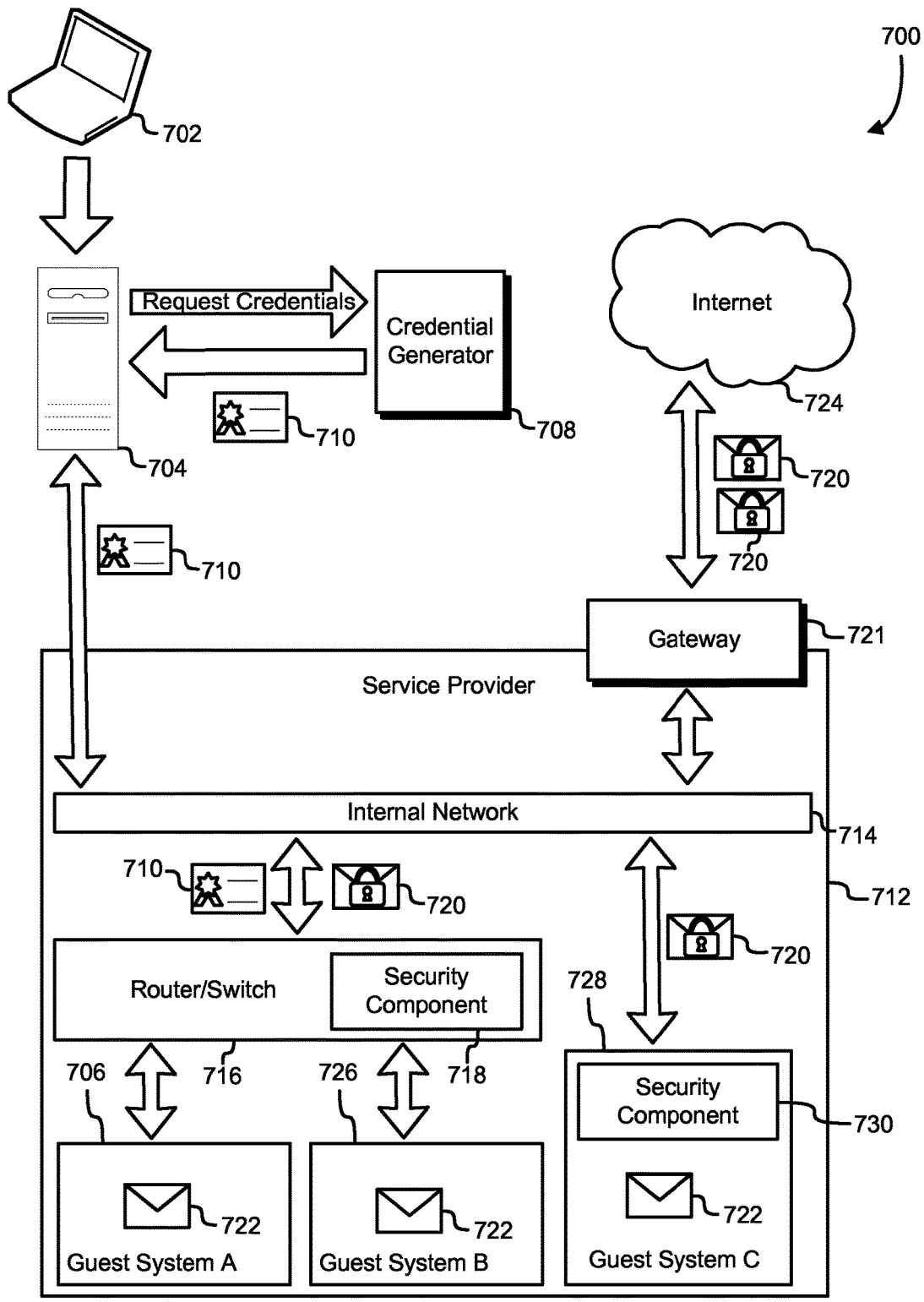
FIG. 7 shows an illustrative example of transfer and use of a credential by a support system within a service provider in accordance with at least one embodiment.

In another embodiment, shown in FIG. 7, a security component 730 may reside inside a host computer 728, such as an enhanced network interface card (NIC) or security co-processing hardware. The security component 730 may intercept incoming communications to the host computer 728 and decrypt incoming secured messages 720. The decrypted cleartext messages 722 may be sent to a guest system within the host computer 728, whether virtualized or not. Outgoing cleartext communications may also be intercepted and secured, including encrypted, to provide secure communications.

Figure 8:
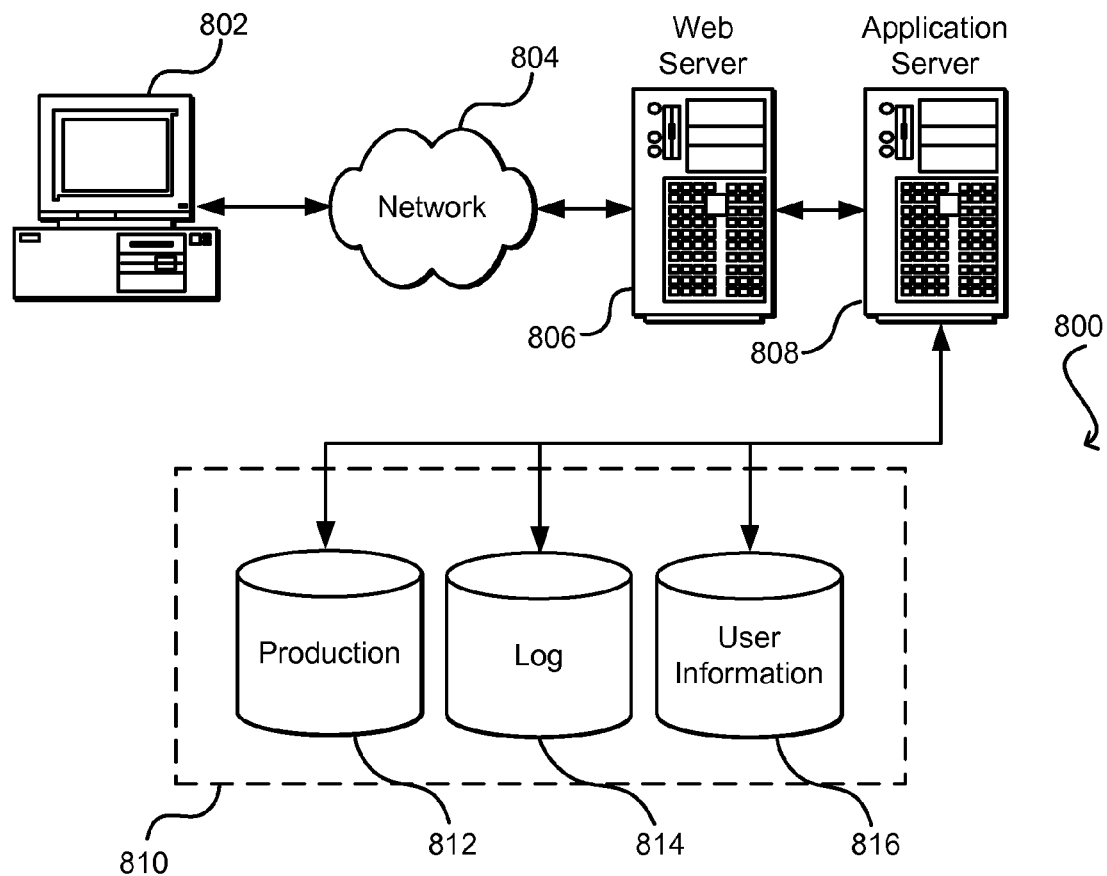
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases, or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the various embodiments as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the scope of the claimed subject matter to the specific form or forms disclosed, but on the contrary, the intention is to cover all modifications, alternative constructions, and equivalents falling within the spirit and scope of the various embodiments, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate various embodiments and does not pose a limitation on the scope of the claimed subject matter unless otherwise indicated. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for providing secure communications, comprising:
   receiving, by a hypervisor, a request for a secure connection between a guest operating system and a computing device, the guest operating system being among a set of guest operating systems supported by the hypervisor;
   using, by the hypervisor on behalf of the guest operating system, in response to the request for the secure connection, a set of cryptographic credentials associated with the guest operating system to establish the secure connection to the computing device using a secure protocol, the hypervisor acting as a local endpoint of the secure connection using the set of cryptographic credentials;
   managing, by the hypervisor, secure communications between the guest operating system and the computing device using the secure protocol and the set of cryptographic credentials; and
   sending, by the hypervisor, one or more unsecured messages to the guest operating system in response to managing the secure communications between the guest operating system and the computing device.

2. The computer-implemented method of claim 1, wherein managing the secure communications between the guest operating system and the computing device further comprises:
   receiving, by the hypervisor, the set of cryptographic credentials associated with the guest operating system from a certificate store;
   encrypting, by the hypervisor, on behalf of the guest operating system using the secure protocol and the set of cryptographic credentials, one or more outgoing messages from the guest operating system to the computing device, the one or more outgoing messages becoming one or more outgoing encrypted messages; and
   sending, by the hypervisor, the one or more outgoing encrypted messages to the computing device using the secure protocol.

3. The computer-implemented method of claim 1, wherein managing the secure communications between the guest operating system and the computing device further comprises:
   receiving, by the hypervisor, the set of cryptographic credentials associated with the guest operating system from a certificate store;
   receiving, by the hypervisor, one or more incoming encrypted messages from the computing device; and
   decrypting, by the hypervisor on behalf of the guest operating system using the secure protocol and the set of cryptographic credentials, the one or more incoming encrypted messages from the computing device becoming one or more decrypted messages, wherein the one or more unsecured messages includes the one or more decrypted messages.

4. A computer system for providing a secure connection, comprising:
   one or more processors;
   one or more memories; and
   a data plane including a support system, wherein the support system includes instructions stored in the one or more memories, the instructions executable by the one or more processors to cause the computer system to at least:
      receive a set of cryptographic credentials associated with a guest operating system, the guest operating system being among a set of guest operating systems supported by the support system;
      use, by the support system on behalf of the guest operating system, a set of cryptographic credentials associated with the guest operating system to establish a secure connection to a computing device using a secure protocol, the support system acting as a local endpoint of the secure connection using the set of cryptographic credentials;

manage secure communications between the guest operating system and the computing device using the secure protocol and the set of cryptographic credentials; and send one or more messages to the guest operating system in response to managing the secure communications between the guest operating system and the computing device.

5. The system of claim 4, wherein the support system is a network interface card.

6. The system of claim 4, wherein the support system includes further instructions executable by the one or more processors to cause the computer system to at least:

capture an outgoing unsecured message from the guest operating system;

examine routing information of the outgoing unsecured message;

encrypt the outgoing unsecured message into an outgoing encrypted message based at least in part on the examination; and direct the outgoing encrypted message toward the computing device.

7. The system of claim 4, wherein the support system includes further instructions executable by the one or more processors to cause the computer system to at least:

capture an incoming secured message directed to the guest operating system;

examine routing information of the incoming secured message;

decrypt the incoming secured message into an incoming decrypted message based at least in part on the examination; and send the incoming decrypted message to the guest operating system.

8. The system of claim 4, wherein the control plane and the data plane reside within a same trust boundary.

9. The system of claim 4, wherein the support system includes further instructions executable by the one or more processors to cause the computer system to at least:

store the set of cryptographic credentials on behalf of the guest operating system.

10. The system of claim 4, wherein the control plane includes further instructions executable by the one or more processors to cause the computer system to at least:

receive a user request for the secure connection between the guest operating system and the computing device, the request including a set of user-specified configuration options.

11. The system of claim 10, wherein the set of user-specified configuration options includes at least one of an indication as to whether to continuously use secure communication, a set of ports to use for secure communication, an indication as to whether to automatically detect secure communication, an indication to use a particular IP address for secure communications, or an indication to use a virtual Ethernet adaptor for secure communications.

12. The system of claim 10, wherein the control plane includes further instructions executable by the one or more processors to cause the computer system to at least:

in response to the request for the secure connection, create a public and private key pair on behalf of the guest operating system;

request the set of cryptographic credentials for the guest operating system from a certificate authority using the public and private key pair;

receive the set of cryptographic credentials;

store the set of cryptographic credentials; and provide the set of cryptographic credentials to the hypervisor.

13. A non-transitory computer-readable storage medium having stored thereon computer-executable instructions that, when executed with one or more processors, cause a computer system to perform operations comprising, at least:

obtaining, by a hypervisor, a set of cryptographic credentials associated with a guest operating system, the guest operating system being among a set of guest operating systems supported by the hypervisor;

using, by the hypervisor on behalf of the guest operating system, the set of cryptographic credentials associated with the guest operating system to establish a secure connection between the hypervisor and a computing device using a secure protocol, the hypervisor acting as a local endpoint of the secure connection using the set of cryptographic credentials;

managing, by the hypervisor, secure communications between the guest operating system and the computing device using the secure protocol and the set of cryptographic credentials; and sending one or more messages to the guest operating system in response to managing the secure communications between the guest operating system and the computing device.

14. The non-transitory computer-readable storage medium of claim 13, having stored thereon further computer-executable instructions that, when executed with the one or more processors, cause the one or more processors to perform operations comprising, at least:

storing, by the hypervisor, the set of cryptographic credentials associated with a guest operating system on behalf of the guest operating system.

15. The non-transitory computer-readable storage medium of claim 13, having stored thereon further computer-executable instructions that, when executed with the one or more processors, cause the one or more processors to perform operations comprising, at least:

updating the secure protocol by the hypervisor, wherein updating occurs independent of the guest operating system.

16. The non-transitory computer-readable storage medium of claim 13, having stored thereon further computer-executable instructions that, when executed with the one or more processors, cause the one or more processors to perform operations comprising, at least:

receiving user input including configuration options, wherein the user input includes an indication that the user desires to enable secure socket layer communications.

17. The non-transitory computer-readable storage medium of claim 16, wherein the user input includes at least one of an indication as to whether to continuously use secure communication, a set of ports to use for secure communication, an indication as to whether to automatically detect secure communication, an indication to use a particular IP address for secure communications, or an indication to use a virtual Ethernet adaptor for secure communications.

18. The non-transitory computer-readable storage medium of claim 16, having stored thereon further computer-executable instructions that, when executed with the one or more processors, cause the one or more processors to perform operations comprising, at least:

determining, from the user input, a channel to use for the secure communications; and restricting a message of the secure communications when the message is provided to the hypervisor using a different channel.

19. The non-transitory computer-readable storage medium of claim 16, having stored thereon further computer-executable instructions that, when executed with the one or more processors, cause the one or more processors to perform operations comprising, at least:
   determining that the secure communication is complete;
   terminating the secure connection using the secure protocol and the set of cryptographic credentials; and
   deleting the set of cryptographic credentials from the hypervisor.

20. The non-transitory computer-readable storage medium of claim 16, wherein the user input is received using an application programming interface, and wherein the user input is provided in response to an offer to add secure communication to the hypervisor in exchange for value.

* * * * *